(12) United States Patent
Stimm (10) Patent No.: US 12,470,558 B1
(45) Date of Patent: Nov. 11, 2025

(54) SYSTEMS AND METHODS FOR SHARING CONTENT THROUGH A CAPTIVE PORTAL

(71) Applicant: GoPro, Inc., San Mateo, CA (US)

(72) Inventor: Daryl Stimm, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 177 days.

(21) Appl. No.: 18/484,390

(22) Filed: Oct. 10, 2023

(51) Int. Cl.
*H04L 9/40* (2022.01)
*G06F 16/955* (2019.01)
*H04L 67/06* (2022.01)
*H04W 12/50* (2021.01)

(52) U.S. Cl.
CPC .......... *H04L 63/10* (2013.01); *G06F 16/9554* (2019.01); *H04L 67/06* (2013.01); *H04W 12/50* (2021.01)

(58) Field of Classification Search
CPC .............................. H04L 63/10; G06F 16/9554
See application file for complete search history.

(56) References Cited

U.S. PATENT DOCUMENTS

2024/0406215 A1* 12/2024 Turnquist .............. H04L 63/166

\* cited by examiner

*Primary Examiner* — Hua Fan
(74) *Attorney, Agent, or Firm* — Esplin & Associates, PC (57) ABSTRACT

Media item(s) stored on an image capture device are identified for sharing. The image capture device runs a web server that hosts the media item(s) and runs a media access webpage for other computing device(s) to access the hosted media item(s). The image capture device creates a communication network having a network name and a network password, generates machine-readable optical code(s) that convey the network name and the network password of the communication network, and presents the machine-readable optical code(s) on an electronic display. A computing device that captures an image including the machine-readable optical code(s) connects to the communication network using the network name and the network password of the communication network conveyed by the machine-readable optical code(s). The media access webpage is provided to the computing device connected to the communication network, which enables a user of the computing device to access the hosted media item(s).

20 Claims, 5 Drawing Sheets

SYSTEMS AND METHODS FOR SHARING CONTENT THROUGH A CAPTIVE PORTAL

FIELD

This disclosure relates to sharing content (e.g., visual content, audio content) through a captive portal.

BACKGROUND

Media items may be stored in the storage of a computing device (e.g., an image capture device, a mobile device, etc.). Offloading the media items to another computing device may require the two computing devices to be paired. Pairing computing devices may be cumbersome and time consuming.

SUMMARY

This disclosure relates to sharing content. A set of media items may be stored in non-transitory, machine-readable storage media. Identification of one or more media items from the set of media items for sharing may be obtained. A web server that hosts the identified media item(s) and a media access webpage to access the identified media item(s) may be run. A communication network may be created. The communication network may have a network name and a network password. One or more machine-readable optical code(s) may be generated. The machine-readable optical code(s) may convey the network name and the network password of the communication network. Presentation of the machine-readable optical code(s) on an electronic display may be effectuated.

A computing device that captures an image including the machine-readable optical code(s) may connect to the communication network using the network name and the network password of the communication network conveyed by the machine-readable optical code(s). The media access webpage may be provided to the computing device connected to the communication network. The media access webpage may include one or more options for a user of the computing device to select one or more media items among the identified media item(s) hosted by the web server. Selection of the media item(s) among the identified media item(s) hosted by the web server may be obtained from the computing device. The selected media item(s) may be provided to the computing device.

A system for sharing content may include one or more electronic storages, one or more electronic displays, one or more processors, and/or other components. In some implementations, one or more components of the system may be carried by an image capture device. For example, the electronic display(s), the electronic storage, and/or the processor(s) may be carried by an image capture device.

The electronic display(s) may be configured to visually present information.

The electronic storage may include non-transitory, machine-readable storage media. The electronic storage may store a set of media items, information relating to media items, information relating to a web server, information relating to a media access webpage, information relating to a communication network, information relating to a machine-readable optical code, and/or other information. In some implementations, the set of media items includes one or more images, one or more videos, and/or other media items.

The processor(s) may be configured by machine-readable instructions. Executing the machine-readable instructions may cause the processor(s) to facilitate sharing content. The machine-readable instructions may include one or more computer program components. The computer program components may include one or more of an identification component, a server component, a network component, an optical code component, a presentation component, an access component, a selection component, a provision component, and/or other computer program components.

The identification component may be configured to obtain identification of one or more media items from the set of media items for sharing.

The server component may be configured to run a web server that hosts the identified media item(s) and a media access webpage to access the identified media item(s).

The network component may be configured to create a communication network. The communication network may have a network name and a network password.

The optical code component may be configured to generate a machine-readable optical code. The machine-readable optical code may convey the network name and the network password of the communication network. In some implementations, the machine-readable optical code may include a QR code.

The presentation component may be configured to effectual presentation of the machine-readable optical code on the electronic display(s). A computing device that captures an image including the machine-readable optical code may connect to the communication network. The computing device may connect to the communication network using the network name and the network password of the communication network conveyed by the machine-readable optical code. In some implementations, the computing device may include a mobile device.

The access component may be configured to provide the media access webpage to the computing device connected to the communication network. The media access webpage may include one or more options for a user of the computing device to select one or more media items among the identified media item(s) hosted by the web server. In some implementations, the media access webpage may be automatically opened by the computing device. The media access webpage may be automatically opened in a browser running on the computing device. The media access webpage may be automatically opened in a mobile application running on the computing device.

The selection component may be configured to obtain, from the computing device, selection of the media item(s) among the identified media item(s) hosted by the web server.

The provision component may be configured to provide the selected media item(s) to the computing device. In some implementations, provision of the selected media item(s) to the computing device may include transmission of a given selected media item to the computing device. In some implementations, provision of the selected media item(s) to the computing device may include streaming of a preview of a given selected media item to the computing device. The preview of the given selected media item may be presented on the media access webpage.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
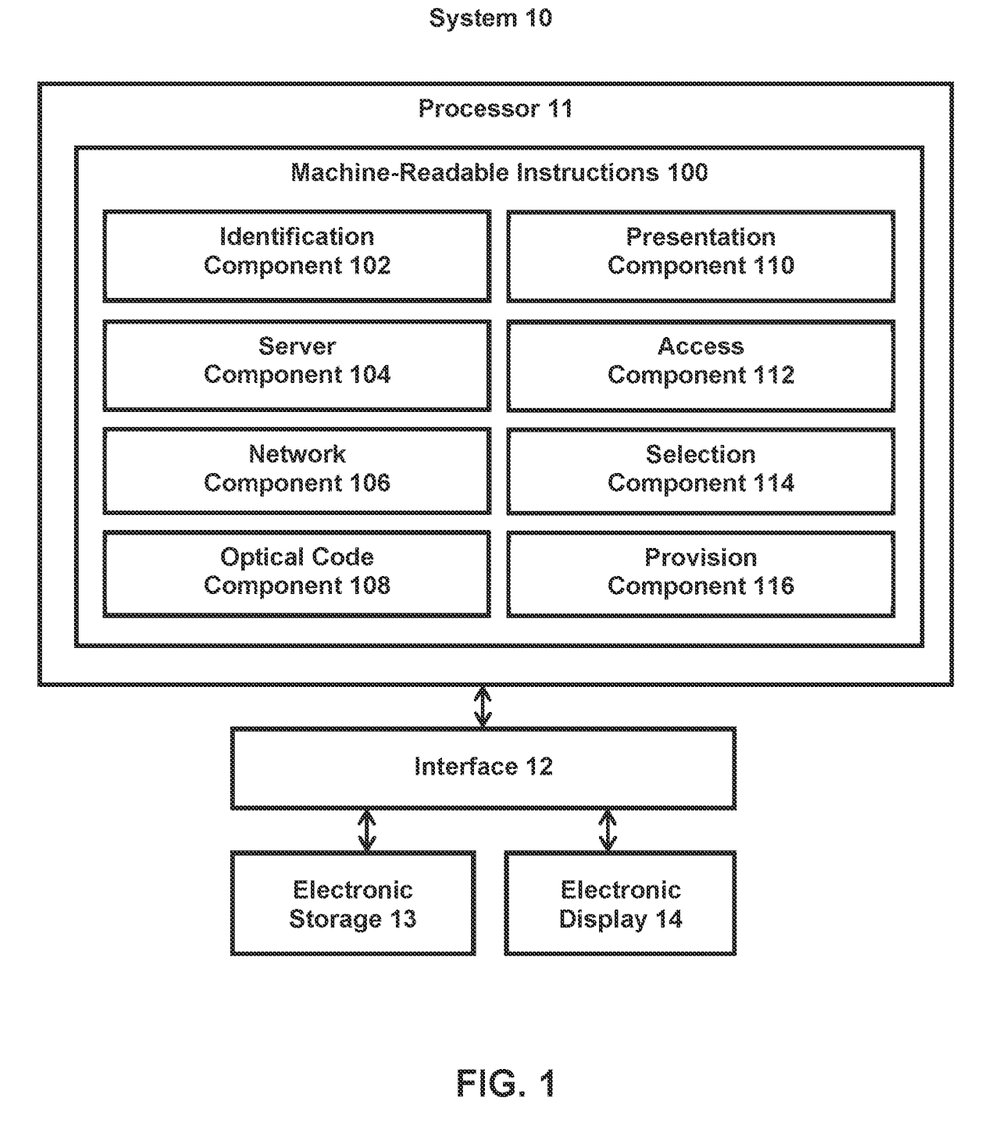
FIG. 1 illustrates an example system for sharing content.

FIG. 1 illustrates a system 10 for sharing content. The system 10 may include one or more of a processor 11, an interface 12 (e.g., bus, wireless interface), an electronic storage 13, an electronic display 14, and/or other components. In some implementations, the system 10 may include one or more optical elements, one or more image sensors, and/or other components. In some implementations, one or more components of the system 10 may be carried by an image capture device. For example, the processor 11, the electronic storage 13, and/or the electronic display 14, may be carried by an image capture device.

A set of media items may be stored in the electronic storage 13 (e.g., non-transitory, machine-readable storage media). Identification of one or more media items from the set of media items for sharing may be obtained by the processor 11. A web server that hosts the identified media item(s) and a media access webpage to access the identified media item(s) may be run by the processor 11. A communication network may be created by the processor 11. The communication network may have a network name and a network password. One or more machine-readable optical code(s) may be generated by the processor 11. The machine-readable optical code(s) may convey the network name and the network password of the communication network. Presentation of the machine-readable optical code(s) on an electronic display may be effectuated by the processor 11.

A computing device that captures an image including the machine-readable optical code(s) may connect to the communication network using the network name and the network password of the communication network conveyed by the machine-readable optical code(s). The media access webpage may be provided by the processor 11 to the computing device connected to the communication network. The media access webpage may include one or more options for a user of the computing device to select one or more media items among the identified media item(s) hosted by the web server. Selection of the media item(s) among the identified media item(s) hosted by the web server may be obtained by the processor 11 from the computing device. The selected media item(s) may be provided by the processor 11 to the computing device.

The electronic storage 13 may be configured to include electronic storage medium that electronically stores information. The electronic storage 13 may include non-transitory, machine-readable storage media. The non-transitory machine-readable storage media may include one or more different types of non-transitory computer-readable media. The non-transitory machine-readable storage media may include permanent memory and/or temporary memory. The non-transitory, machine-readable storage media may be configured to store information, such as one or more media items. The non-transitory, machine-readable storage media may store media items captured by the system 10 and/or other computing devices/systems.

The electronic storage 13 may store software algorithms, information determined by the processor 11, information received remotely, and/or other information that enables the system 10 to function properly. For example, the electronic storage 13 may store a set of media items, information relating to media items, information relating to a web server, information relating to a media access webpage, information relating to a communication network, information relating to a machine-readable optical code, and/or other information.

The electric display 14 may include an electronic device that provides visual presentation of information. The electric display 14 may include a color display and/or a non-color display. The electronic display 14 may be configured to visually present information. The electronic display 14 may be configured to present one or more graphical user interfaces. A graphical user interface may include a graphical form that enables a user to interact with the system 100 and/or see information provided by the system 10. A button presented on the electronic display 14 may be referred to as a virtual button.

The electronic display 14 may include one or more touchscreen displays. A touchscreen display may be configured to receive user input via a user's engagement with the touchscreen display. A user may engage with the touchscreen display via interaction with one or more touch-sensitive surfaces/screens and/or other components of the touchscreen display. The touchscreen display may be configured to receive user input to operate the system 10. For example, the touchscreen display may present one or more options for a user to provide input to the system 10, such as by presenting one or more virtual (soft) buttons. The user may select one or more media items for sharing with one or more computing devices by engaging with the options presented on the touchscreen display.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, the processor 11 and the electronic display 14 of the system 10 may be carried by the housing of the image capture device. The housing may carry other components, such as the electronic storage 13. References to the housing of an image capture device may refer to the image capture device, and vice versa.

An image capture device may refer to a device that captures visual content. An image capture device may capture visual content in the form of images, videos, and/or other forms. An image capture device may refer to a device for recording visual information in the form of images, videos, and/or other media. An image capture device may be a standalone device (e.g., camera, action camera, image sensor) or may be part of another device (e.g., part of a smartphone, tablet, laptop, television).

Figure 3:
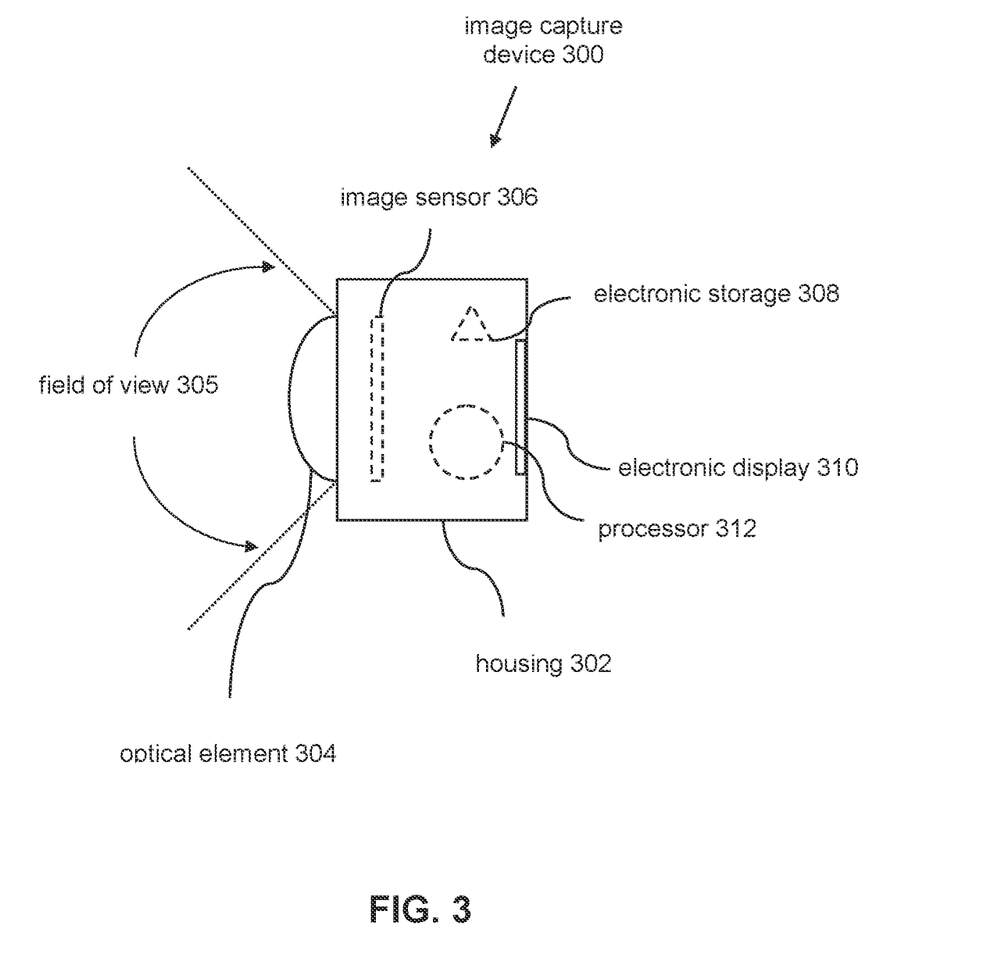
FIG. 3 illustrates an example image capture device.

FIG. 3 illustrates an example image capture device 300. Visual content (e.g., of image(s), video frame(s)), audio content, metadata relating to the visual content and/or audio content, and/or other content may be captured by the image capture device 300. The image capture device 300 may include a housing 302. The housing 302 may refer a device (e.g., casing, shell) that covers, protects, and/or supports one or more components of the image capture device 300. The housing 302 may include a single-piece housing or a multi-piece housing. The housing 302 may carry one or more components of the image capture device 300. The housing 302 may carry (be attached to, support, hold, and/or otherwise carry) one or more of an optical element 304, an image sensor 306, an electronic storage 308, an electronic display 310, a processor 312, and/or other components.

One or more components of the image capture device 300 may be the same as, be similar to, and/or correspond to one or more components of the system 10. For example, the processor 312 may be the same as, be similar to, and/or correspond to the processor 11. The electronic storage 308 may be the same as, be similar to, and/or correspond to the electronic storage 13. The electronic display 310 may be the same as, be similar to, and/or correspond to the electronic display 14.

The optical element 304 may include instrument(s), tool(s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may have a field of view 305. The optical element 304 may be configured to guide light within the field of view 305 to the image sensor 306.

The field of view 305 may include the field of view of a scene that is within the field of view of the optical element 304 and/or the field of view of the scene that is delivered to the image sensor 306. For example, the optical element 304 may guide light within its field of view to the image sensor 306 or may guide light within a portion of its field of view to the image sensor 306. The field of view of 305 of the optical element 304 may refer to the extent of the observable world that is seen through the optical element 304. The field of view 305 of the optical element 304 may include one or more angles (e.g., vertical angle, horizontal angle, diagonal angle) at which light is received and passed on by the optical element 304 to the image sensor 306. In some implementations, the field of view 305 may be greater than 180-degrees. In some implementations, the field of view 305 may be less than 180-degrees. In some implementations, the field of view 305 may be equal to 180-degrees.

In some implementations, the image capture device 300 may include multiple optical elements. For example, the image capture device 300 may include multiple optical elements that are arranged on the housing 302 to capture spherical images/videos (guide light within spherical field of view to one or more images sensors). For instance, the image capture device 300 may include two optical elements positioned on opposing sides of the housing 302. The fields of views of the optical elements may overlap and enable capture of spherical images and/or spherical videos.

The image sensor 306 may include sensor(s) that converts received light into output signals. The output signals may include electrical signals. The image sensor 306 may generate output signals conveying information that defines visual content of one or more images and/or one or more video frames of a video. For example, the image sensor 306 may include one or more of a charge-coupled device sensor, an active pixel sensor, a complementary metal-oxide semiconductor sensor, an N-type metal-oxide-semiconductor sensor, and/or other image sensors.

The image sensor 306 may be configured to generate output signals conveying information that defines visual content of one or more images and/or one or more video frames of a video. The image sensor 306 may be configured to generate a visual output signal based on light that becomes incident thereon during a capture duration and/or other information. The visual output signal may convey visual information that defines visual content having the field of view. The optical element 304 may be configured to guide light within the field of view 305 to the image sensor 306, and the image sensor 306 may be configured to generate visual output signals conveying visual information based on light that becomes incident thereon via the optical element 304.

The visual information may define visual content by including information that defines one or more content, qualities, attributes, features, and/or other aspects of the visual content. For example, the visual information may define visual content of an image by including information that makes up the content of the image, and/or information that is used to determine the content of the image. For instance, the visual information may include information that makes up and/or is used to determine the arrangement of pixels, characteristics of pixels, values of pixels, and/or other aspects of pixels that define visual content of the image. For example, the visual information may include information that makes up and/or is used to determine pixels of the image. Other types of visual information are contemplated.

Capture of visual content by the image sensor 306 may include conversion of light received by the image sensor 306 into output signals/visual information defining visual content. Capturing visual content may include recording, storing, and/or otherwise capturing the visual content for use in generating video content (e.g., content of video frames). For example, during a capture duration, the visual output signal generated by the image sensor 306 and/or the visual information conveyed by the visual output signal may be used to record, store, and/or otherwise capture the visual content for use in generating video content.

In some implementations, the image capture device 300 may include multiple image sensors. For example, the image capture device 300 may include multiple image sensors carried by the housing 302 to capture spherical images/videos based on light guided thereto by multiple optical elements. For instance, the image capture device 300 may include two image sensors configured to receive light from two optical elements positioned on opposing sides of the housing 302. The fields of views of the optical elements may overlap and enable capture of spherical images and/or spherical videos.

The image capture device 300 may include other components not shown in FIG. 3. The image capture device 300 may not include one or more components shown in FIG. 3. Other configurations of image capture devices are contemplated.

For example, the image capture device 300 may include other sensors. For example, the image capture device 300 may include one or more sound sensors (e.g., microphones) to capture audio content, one or more location sensors (e.g., GPS sensors) to measure location of the image capture device, one or more position sensors (e.g., gyroscope, accelerometer, inertial measurement unit) to measure position, movement, and/or orientation of the image capture device, and/or other sensors. In some implementations, information about location, position, and/or movement of the image capture device may be stored as metadata of other content (e.g., visual content, audio content) captured by the image capture device.

The image capture device may include one or more communication devices to communicate with other computing devices (e.g., other image capture device, a smartphone, tablet, laptop, desktop). For example, the image capture device may include one or more transmitters, one or more receivers, and/or other communication devices. A transmitter may refer to equipment used to generate and/or transmit electromagnetic waves carrying information. A transmitter may be part of or separate from a device including a receiver. A transmitter may be configured to transmit information via the electromagnetic waves. A transmitter may generate and/or transmit electromagnetic waves based on one or more wireless communication technologies, such as WiFi and/or Bluetooth. A receiver may refer to equipment used to receive and/or convert electromagnetic waves carrying information. A receiver may be part of or separate from a device including a transmitter. A receiver may be configured to receive information via the electromagnetic waves. A receiver may receive and/or convert electromagnetic waves based on one or more wireless communication technologies, such as WiFi and/or Bluetooth. Use of other communication technologies is contemplated.

The processor 312 may include one or more processors (logic circuitry) that provide information processing capabilities in the image capture device. The processor may provide one or more computing functions for the image capture device. The processor may operate/send command signals to one or more components of the image capture device to operate the image capture device. For example, referring to FIG. 3, the processor 312 may facilitate operation of the image capture device 300 in capturing image(s) and/or video(s), facilitate operation of the optical element 304 (e.g., change how light is guided by the optical element 304), and/or facilitate operation of the image sensor 306 (e.g., change how the received light is converted into information that defines images/videos and/or how the images/videos are post-processed after capture).

The processor 312 may obtain information from the image sensor 306 and/or facilitate transfer of information from the image sensor 306 to another device/component. The processor 312 may obtain information from other sensor(s) and/or facilitate transfer of information from other sensor(s) to another device/component. The processor 312 may be remote from the processor 11 or local to the processor 11. One or more portions of the processor 312 may be remote from the processor 11 and/or one or more portions of the processor 10 may be part of the processor 312. The processor 312 may include and/or perform one or more functionalities of the processor 11 shown in FIG. 1.

For example, a set of media items may be stored in the electronic storage 308. The processor 312 may obtain identification of one or more media items for sharing. The processor may run a web server that hosts the identified media item(s). The processor 312 may run a media access webpage for other computing devices to access the identified media item(s). The processor 312 may create a communication network having a network name and a network password. The processor 312 may generate one or more machine-readable optical code(s) (e.g., QR code(s)) that convey the network name and the network password of the communication network. The processor 312 may effectuate presentation of the machine-readable optical code(s) on the electronic display 310.

One or more computing devices that captures an image including the machine-readable optical code(s) presented on the electronic display 310 may connect to the communication network using the network name and the network password of the communication network conveyed by the machine-readable optical code(s). The media access webpage may be provided to the computing device(s) connected to the communication network. The media access webpage may include one or more options for a user of a connected computing device to select among the media item(s) hosted by the web server. Selection of the media item(s) may be obtained from the computing device, and the selected media item(s) may be provided to the computing device.

Figure 4:
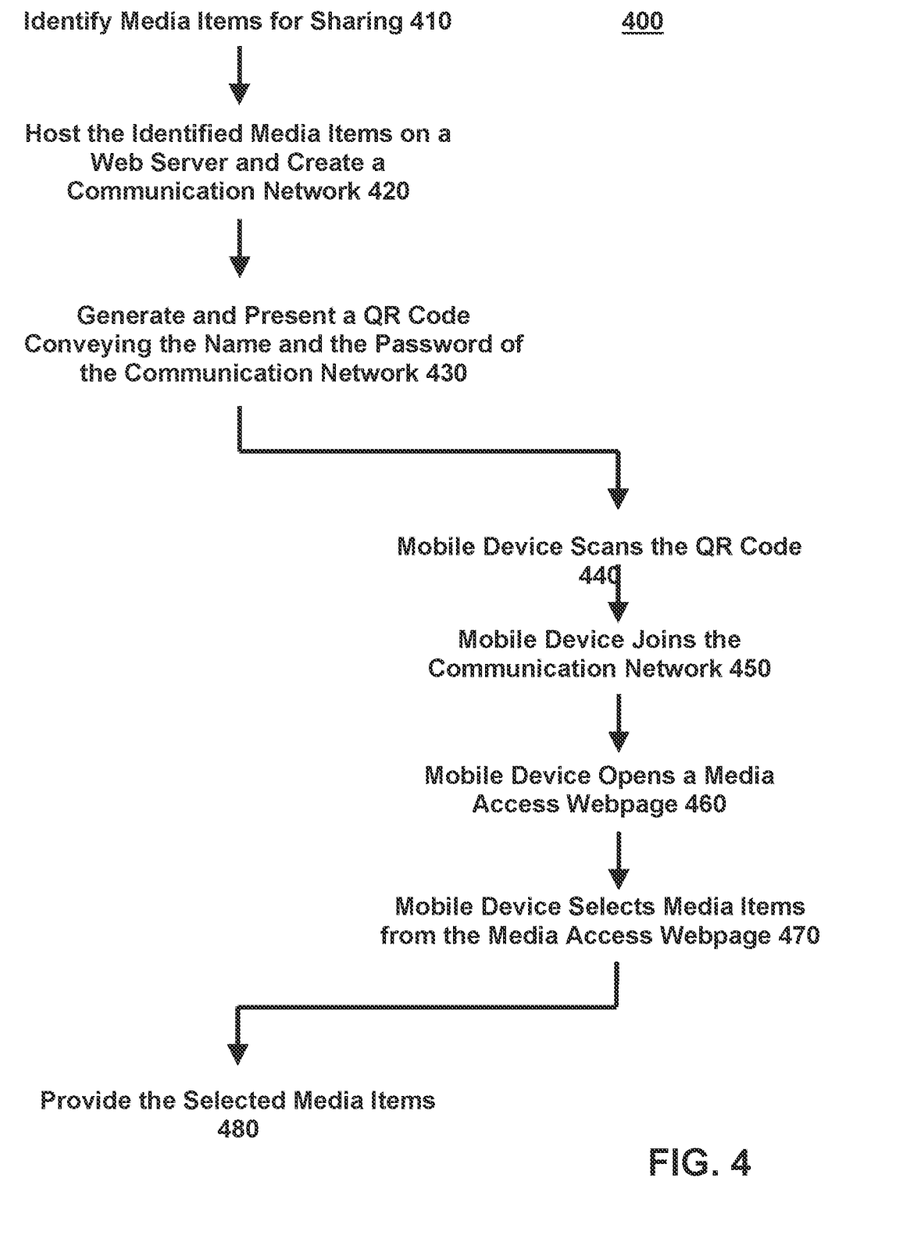
FIG. 4 illustrates an example process for sharing content.

FIG. 4 illustrates an example process 400 for sharing content. The process 400 may be utilized to enable sharing of media items stored on a computing device with one or more other computing devices. For this example, an image capture device will be used as the computing device from which media items are shared and a mobile device will be used as the computing device to which media items are shared. Sharing from and to other computing devices are contemplated. While FIG. 4 shows media items being shared with a single mobile device, this is merely as an example and is not meant to be limiting. The process 400 may be utilized to share media items from a computing device with another computing device or with multiple other computing devices.

The image capture device may store media items in one or more electronic storage. The media items of the image capture device may be identified for sharing 410. For example, a user may interact with a graphical user interface presented on an electronic display of the image capture device to select media items to be shared with one or more computing devices. The user may finalize the selection (e.g., clicking on a "Share" button presented on the electronic display after selecting the media items) to proceed to the next step.

The media items identified for sharing may be hosted on a web server by the image capture device, and a communication network may be created by the image capture device to enable the mobile device's access to the hosted media items 420. The image capture device may run the web server and a media access webpage to enable access of the mobile device to the media items hosted on the web server. The communication network may be created with a network name, and access to the communication network may be controlled/restricted via use of a network password.

The image capture device may generate a QR code (or other machine-readable optical code) conveying the network name and the network password of the communication network and present the QR code on an electronic display 430. The mobile device may scan the QR code and retrieve/extract the network name and the network password of the communication network conveyed by the QR code 440. The mobile device may use the network name and the network password of the communication network conveyed by the QR code to join the communication network 450 created by the image capture device. The mobile device may prompt the user to confirm that the user wants the mobile device to join the communication network. User confirmation may be saved so that future connections are performed without requiring user confirmation.

Once joined to the communication network, the mobile device may open the media access webpage 460. The media access webpage may provide access to the media items hosted on the web server. The media access webpage may be opened automatically by the mobile device. The media access webpage may be opened automatically by the mobile device after connecting to the communication network. For example, the media access webpage may be/operate as a captive portal. A captive portal may refer to a webpage displayed on a computing device that is newly connected to the communication network A captive portal may require one or more interaction from the user before granting access to one or more network resources. The media access webpage may be/operate as a captive portal in that the media access webpage is displayed on the mobile device after it connects to the communication network. The media access webpage may be/operate as a captive portal in that the user of the mobile device needs to interact with the media access webpage to access the media items hosted on the web server. The media access webpage may be opened in a browser of the mobile device and/or a mobile application running on the mobile device.

The mobile device may select media items from the media access webpage for accessing 470. For example, a user of the mobile device may interact with the mobile device to select one or more of the media items hosted on the web server by using the media access webpage. For example, the media access webpage may provide a view of individual media items hosted on the web server. For instance, the media access webpage may include icons/previews (e.g., static preview image, dynamic preview images) for the individual media items hosted on the web server. The user of the mobile device may select one or more of the icons/previews of the media items to access the corresponding media item(s). Accessing a media item through the media access webpage may include playing the media item on the media access webpage (e.g., streaming a playback of the media item on the media access webpage), downloading the media item to the mobile device, and/or otherwise consuming the media item. The media items selected by the user of the mobile device via interaction with the media access webpage may be provided to the mobile device 480.

Referring back to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate sharing content. The machine-readable instructions 100 may include one or more computer program components. The machine-readable instructions 100 may include one or more of an identification component 102, a server component 104, a network component 106, an optical code component 108, a presentation component 110, an access component 112, a selection component 114, a provision component 116, and/or other computer program components.

The identification component 102 may be configured to obtain identification of one or more media items from the set of media items for sharing. Obtaining identification of a media item may include one or more of accessing, acquiring, analyzing, determining, examining, identifying, loading, locating, opening, receiving, retrieving, reviewing, selecting, storing, and/or otherwise obtaining the identification of the media item. A media item may be identified for sharing by one or more users and/or one or more computing devices. Identifying a media item from a set of media items may include ascertaining, choosing, discovering, finding, selecting, and/or otherwise identifying the media item from the set of media items. A media items may be automatically identified from the set of media items for sharing by a computing device based on one or more characteristics of the media item. A media items may be manually identified from the set of media items for sharing by a user. For example, a user may browse through media items and choose one or more of the media items for sharing with one or more other computing devices. Other identification of media items for sharing is contemplated.

Media items may refer to items that may be visually and/or audibly consumed. Media items may refer to multimedia items. For example, media items may include images, videos, sound clips, and/or other media items. Media items may be captured by one or more image capture devices. A set of media items may include multiple media items. A set of media items may include a group of media items. A set of media items includes one or more images, one or more videos, and/or other media items. Individual media items may be stored in a single file or in multiple files. Multiple media items may be stored in a single file or in multiple files.

In some implementations, media items may include a media item that has been captured. For example, a media item may include images, videos, sound clips, and/or other media items that have been captured by image capture device(s). In some implementations, media items may include a media item that is being captured and/or that will be captured in the future. For example, a media item may include images, videos, sound clips, and/or other media items that is being captured by image capture device(s) and/or that will be captured by image capture device(s). For example, media items may include a streaming media item that includes images, videos, sound clips, and/or other media items that is currently being captured by an image capture device and/or that will be captured by the image capture device (e.g., in the future streaming session). While the descriptions are provided for sharing of media items, other types of information may be shared using the present disclosure. For example, any type of information stored by an image capture device may be shared with other computing devices using the present disclosure.

The server component 104 may be configured to run a web server that hosts the identified media item(s) and a media access webpage to access the identified media item(s). Running a web server/media access webpage may include executing, launching, utilizing, and/or otherwise running the web server/media access webpage. A web server may refer to computer software and/or underlying hardware that is capable of delivering content to computing devices over a communication network via a browser. A web server may receive requests and respond with content and/or an error message. A web server may host the media item(s) identified for sharing. A web server may receive requests for the media item(s) form a computing device and respond by providing the media item(s) to the computing device.

A media access webpage may refer to a webpage that provides access to media items hosted by the web server. A webpage may refer to a hypertext document. A webpage may include a text file written in markup language that describes the content of the webpage and includes references to one or more resources, such as media item(s) hosted by the web server. A webpage may include a structured document that includes text with links, with the links pointing to one or more resources, such as media item(s) hosted by the web server.

The network component 106 may be configured to create a communication network. A communication network may refer to one or more connections/links between computing devices that enable a computing device connected to the communication connection to exchange (e.g., send, receive) information with one or more other computing devices connected to the communication network. A communication connection may enable direct exchange of information (e.g., an image capture device and a mobile device directly exchanging information with each other). A communication network may include a wireless communication network, such as a network using WiFi, Bluetooth, and/or other wireless communication technologies. A wireless communication network may refer to such connections/links that enable wireless exchange/transmission of information between computing devices.

The communication network created by the network component 106 may have a network name, a network password, and/or other characteristics. The network name may identify the communication network. For example, the network name may include the service set identifier (SSID) of the communication network. The network password may be required to connect to the communication network. The network password may be the security key required to access the communication network.

The optical code component 108 may be configured to generate one or more machine-readable optical codes. A machine-readable optical code may include/refer to a visual representation of data. The visual representation of data may be readable by a computing device based on capture of an image/video including the machine-readable optical code. A machine-readable optical code may encode the data visually by varying the size and shape of patterns within the machine-readable optical code. The data may be encoded within a machine-readable optical code using one or more encoding modes. A machine-readable optical code may include a one-dimensional machine-readable optical code (e.g., continuous or discrete barcodes), a two-dimensional machine-readable optical code (e.g., QR code), and/or a three-dimensional machine-readable optical code (e.g., holograms). A machine-readable optical code may include one or more varying components (e.g., a barcode/QR code/hologram that changes with time/location/operation). Other dimensions and types of machine-readable optical codes are contemplated.

The machine-readable optical code(s) may be generated based on the network name of the communication network, the network password of the communication network, and/or other information. The machine-readable optical code(s) may convey the network name of the communication network, the network password of the communication network, and/or other information. The machine-readable optical code(s) may be generated to convey the network name of the communication network, the network password of the communication network, and/or other information. The machine-readable optical code(s) may convey instructions configured to cause a computing device to, in response to the computing device capturing an image including the machine-readable optical code(s), connect to the communication network using the network name of the communication network, the network password of the communication network, and/or other information conveyed by the machine-readable optical code(s).

The presentation component 110 may be configured to effectual presentation of the machine-readable optical code (s) and/or other information on the electronic display 14. The machine-readable optical code(s) may be presented on the electronic display 14 at a time, over a period of time, at a location, or over a range of locations. The machine-readable optical code(s) may be presented on the display 14 so that one or more computing devices with image sensor(s) (e.g., mobile device, laptop, desktop) may capture one or more images including the machine-readable optical code(s). A computing device that captures an image including the machine-readable optical code may connect to the communication network created by the network component 106. A computing device may connect to the communication network using the network name of the communication network, the network password of the communication network, and/or other information conveyed by the machine-readable optical code.

A computing device that captures an image including the machine-readable optical code(s) may connect to a communication network with the network name identified by the machine-readable optical code(s). The computing device that captures an image including the machine-readable optical code(s) may connect to the communication network by providing the network password identified by the machine-readable optical code(s). The computing device may require the user of the computing device to verify the information conveyed by the machine-readable optical code(s) and/or require the user of the computing device to confirm that the user desires the computing device to connect to the communication network before using the information conveyed by the machine-readable optical code(s) to connect to the communication network.

Rather than requiring the computing device to pair with the system 10 to share the media items, the system 10 may create a communication network and visually encode information needed by the computing device to connect to the communication network in the machine-readable optical code(s) to share the media items. Multiple computing devices may connect to the communication network at the same time by capturing images of the machine-readable optical code(s). A computing device connecting the communication network may enable the computing device and the system 10 to communicate with each other (e.g., request information, provide information).

In some implementations, in addition to or alternative to conveying information on the communication network via the machine-readable optical code(s), information on the communication network may be wirelessly communicated to the computing device. For example, in addition to or alternative to generating and presenting a QR code that conveys the network name and the network password of the communication network, the network name and the network password of the communication network may be wirelessly communicated by the system 10 to the computing device. The computing device may connect to the communication network using the information on the communication network communicated by the system 10 to the computing device.

For example, the system 10 may transmit/broadcast a wireless message/tag (e.g., NFC/BT message/tag) that includes the network name and the network password of the communication network. The computing device may receive the wireless message/tag. The computing device may provide a visual notification (e.g., message, icon, graphic presented on an electronic display), an audio notification (e.g., sound, voice announcement/response), and/or other notification of the received message/tag and/or the information contained within the received message/tag. The computing device may require the user of the computing device to verify the received message/tag and/or require the user of the computing device to confirm that the user desires the computing device to connect to the communication network before using the information included in the received message/tag to connect to the communication network.

In some implementations, the computing device may be authenticated for connection to the communication network via use of wireless communication. For example, responsive to user input to connect to the communication network (e.g., user confirmation of the machine-readable optical code(s)/received message/tag), an authentication message may be generated by the computing device and transmitted to the system 10. For example, a token message containing an authentication code followed by one or more randomly-generated characters may be generated by the computing device and transmitted to the system 10/the web server. The authentication code and the randomly-generated character(s) may be used (e.g., by the system 10, the web server, an authentication server) to confirm that the computing device should be allowed to connect to the communication network.

The access component 112 may be configured to provide the media access webpage to the computing device(s) connected to the communication network. Providing the media access webpage to a computing device may include sending, transmitting, making available, and/or otherwise providing the media access webpage to the computing device. The media access webpage may be provided to the computing device(s) over the communication network. In some implementations, the media access webpage may be automatically opened by the computing device(s). The media access webpage may be automatically opened by a computing device that connects to the communication network.

In some implementations, the media access webpage may be automatically opened in a browser running on a computing device. In some implementations, the media access webpage may be automatically opened in a mobile application running on a computing device. A browser may refer to an application for accessing webpages. A browser may refer to a mobile browser, a desktop browser, and/or other types of browser. A browser may refer to a general-purpose browser that is able to interact with webpages in general. A browser may refer to a specific-purpose browser that is designed to interact with specific webpages (e.g., browser applications for mobile devices designed to access specific URLs). A browser may enable a user to navigate to different parts of a webpage or between different webpages. A browser may include one or more graphical user interfaces for displaying and navigating websites. In some implementations, the web server may host a mobile application and/or a micro application for opening the media access webpage. A computing device that connects to the communication network may download the mobile/micro application from the web server, install the mobile/micro application, and open the media access webpage suing the mobile/micro application.

When a computing device connects to the communication network, the media access webpage (e.g., HTML file for the webpage) may be provided by the web server and downloaded by the browser. Upon connection to the communication network, the computing device may open the media access webpage without additional interaction from the user.

The browser may utilize the text, markup, content, references, and/or other information contained in the media access webpage to render an expression of the media access webpage. The browser may transform the content of the media access webpage into an interactive visual and/or audio representation on the computing device running the browser. The content of the media access webpage may include visual elements, audio elements, haptic elements, static elements, dynamic elements, interactive elements, non-interactive elements, and/or other elements.

The media access webpage may include one or more options for a user of a computing device to select one or more media items among the media item(s) hosted by the web server. The media access webpage may include visual representation of the media item(s) hosted by the web server. The media access webpage may include one or more interactive elements that allow a user to choose from one or more of the media item(s) hosted by the web server. The media access webpage may include one or more options for a user of a computing device to obtain access to information stored hosted by the web server. The media access webpage may prevent access by a computing device to other information stored by the system 10.

The selection component 114 may be configured to obtain, from the computing device(s), selection of the media item(s) among the identified media item(s) hosted by the web server. Obtaining selection of a media item from a computing device may include one or more of accessing, acquiring, analyzing, determining, examining, identifying, loading, locating, opening, receiving, retrieving, reviewing, selecting, storing, and/or otherwise obtaining the selection of the media item from the computing device. The selection component 114 may be configured to obtain selection of a media item from a computing device over the communication network. A media item may be automatically selected for access by a computing device based on one or more characteristics of the media item. A media item may be manually selected for access by a user. For example, a user of a computing device may browse through the media items hosted by the web server using the media access webpage, and choose one or more of the media items for access by interacting with one or more options provided on the media access webpage (e.g., clicking on a visual representation of a media item on the media access webpage, clicking on a "Download" or a "Play" button after selecting one or more media items).

The provision component 116 may be configured to provide the selected media item(s) to the computing device(s). Providing a media item to a computing device may include presenting, sending, transmitting, making available, and/or otherwise providing the media item to the computing device. The provision component 116 may be configured to provide a selected media item to a computing device over the communication network. In some implementations, provision of the selected media item(s) to the computing device(s) may include transmission of a given selected media item to a computing device. For example, the selected media item may be downloaded from the web server to the computing device on which the media item was selected (through the media access webpage). In some implementations, provision of the selected media item(s) to the computing device(s) may include streaming of a preview of a given selected media item to the computing device. For example, a playback of the selected media item may be streamed to the computing device on which the media item was selected. The preview of the selected media item may be presented on the media access webpage. Rather than switching to a video player application/software to play the selected media item, the playback of the media items may occur within the media access webpage.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2A:
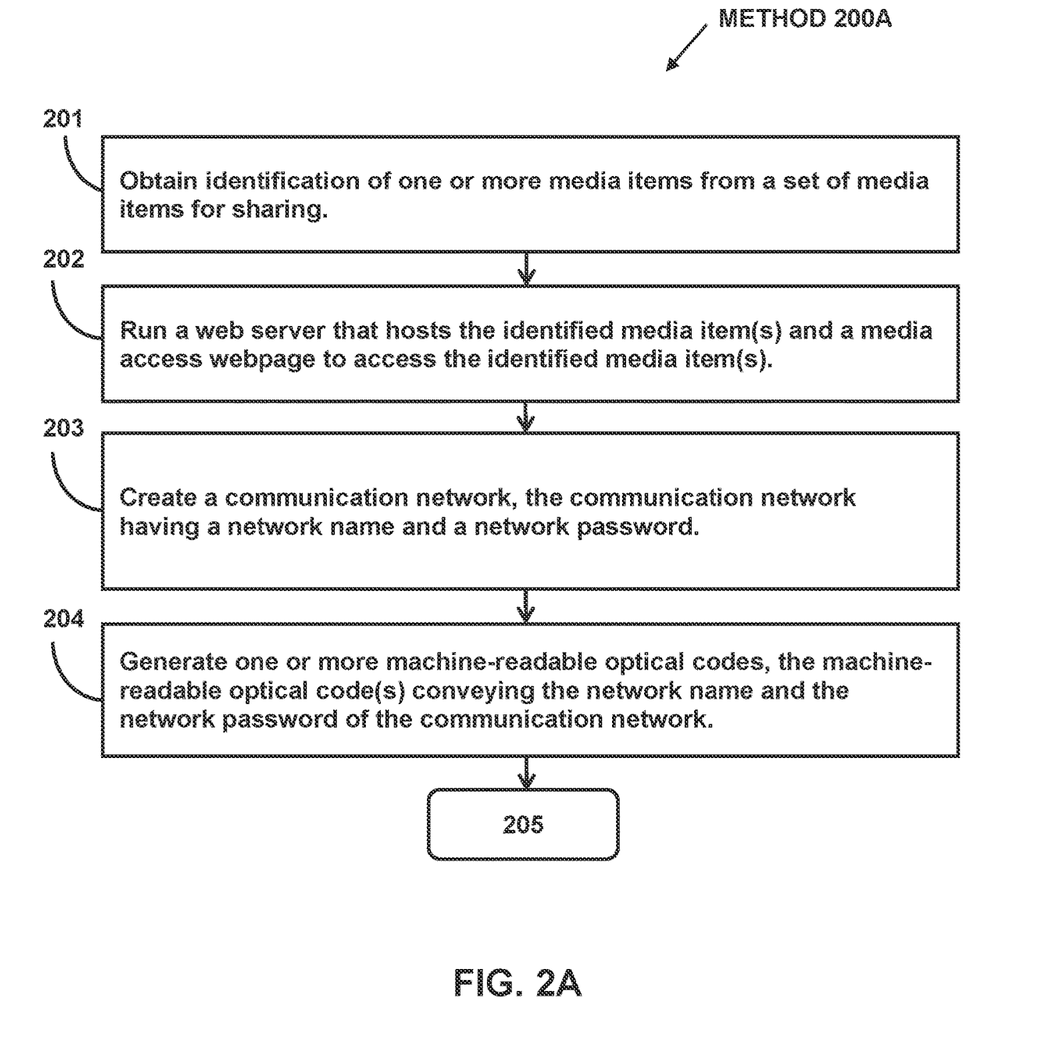
FIG. 2A illustrates an example method for sharing content.
Figure 2B:
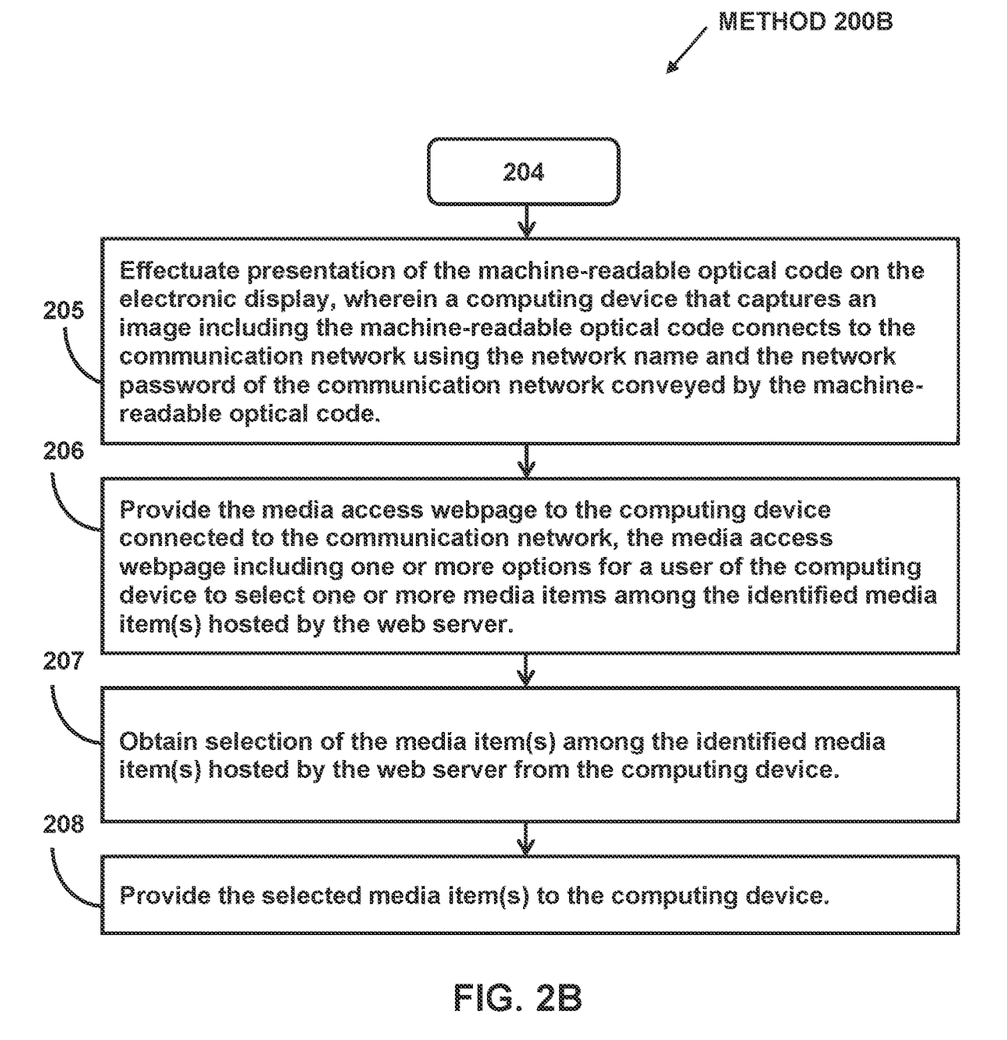
FIG. 2B illustrates an example method for sharing content.

FIGS. 2A and 2B illustrates method 200A, 200B for sharing content. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200A, 200B may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200A, 200B in response to instructions stored electronically on one or more electronic storage media. The one or more processing devices may include one or more devices configured through hardware, firmware, and/or software to be specifically designed for execution of one or more of the operations of method 200A, 200B.

Referring to FIG. 2A and method 200A, a set of media items may be stored in non-transitory, machine-readable storage media. At operation 201, identification of one or more media items from the set of media items for sharing may be obtained. In some implementations, operation 201 may be performed by a processor component the same as or similar to the identification component 102 (Shown in FIG. 1 and described herein).

At operation 202, a web server that hosts the identified media item(s) and a media access webpage to access the identified media item(s) may be run. In some implementations, operation 202 may be performed by a processor component the same as or similar to the server component 104 (Shown in FIG. 1 and described herein).

At operation 203, a communication network may be created. The communication network may have a network name and a network password. In some implementations, operation 203 may be performed by a processor component the same as or similar to the network component 106 (Shown in FIG. 1 and described herein).

At operation 204, one or more machine-readable optical codes may be generated. The machine-readable optical code(s) may convey the network name and the network password of the communication network. In some implementations, operation 204 may be performed by a processor component the same as or similar to the optical code component 108 (Shown in FIG. 1 and described herein).

Referring to FIG. 2B and method 200B, at operation 205, presentation of the machine-readable optical code(s) on an electronic display may be effectuated. A computing device that captures an image including the machine-readable optical code(s) may connect to the communication network using the network name and the network password of the communication network conveyed by the machine-readable optical code(s). In some implementations, operation 205 may be performed by a processor component the same as or similar to the presentation component 110 (Shown in FIG. 1 and described herein).

At operation 206, the media access webpage may be provided to the computing device connected to the communication network. The media access webpage may include one or more options for a user of the computing device to select one or more media items among the identified media item(s) hosted by the web server. In some implementations, operation 206 may be performed by a processor component the same as or similar to the access component 112 (Shown in FIG. 1 and described herein).

At operation 207, selection of the media item(s) among the identified media item(s) hosted by the web server may be obtained from the computing device. In some implementations, operation 207 may be performed by a processor component the same as or similar to the selection component 114 (Shown in FIG. 1 and described herein).

At operation 208, the selected media item(s) may be provided to the computing device. In some implementations, operation 208 may be performed by a processor component the same as or similar to the provision component 116 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An image capture device for sharing content, the image capture device comprising:
 a housing;
 an electronic display carried by the housing, the electronic display configured to visually present information;
 non-transitory, machine-readable storage media carried by the housing, the non-transitory, machine-readable storage media configured to store information, wherein a set of media items captured by the image capture device is stored in the non-transitory, machine-readable storage media; and
 one or more physical processors carried by the housing, the one or more physical processors configured by machine-readable instructions to:
  obtain a user identification of one or more media items from the set of media items captured by the image capture device for sharing;
  run a web server that hosts the one or more identified media items;
  run a media access webpage for a computing device to access the one or more identified media items hosted by the web server run by the image capture device;
  create a communication network for the computing device to connect to the image capture device, the communication network having a network name and a network password;
  generate a machine-readable optical code, the machine-readable optical code conveying the network name and the network password of the communication network;
  present the machine-readable optical code on the electronic display, wherein a mobile device that captures an image including the machine-readable optical code connects to the communication network using the network name and the network password of the communication network conveyed by the machine-readable optical code, further wherein responsive to the mobile device connecting to the communication network created by the image capture device, the media access webpage run by the image capture device is automatically opened in a browser or a mobile application running on the mobile device, the media access webpage operating as a captive portal for the one or more identified media items hosted by the web server run by the image capture device, the media access webpage including one or more options for a user of the mobile device to select one or more media items from among the one or more identified media items hosted by the web server for access by the mobile device;
  obtain, from the mobile device, selection of the one or more media items among the one or more identified media items hosted by the web server; and
  provide the one or more selected media items to the mobile device.

2. The system of claim 1, wherein:
 the machine-readable optical code includes a QR code; and
 the image capture device providing the one or more selected media items to the mobile device includes the image capture device transmitting a given selected media item to the mobile device or the image capture device streaming a preview of the given selected media item to the mobile device.

3. An image capture device for sharing content, the image capture device comprising:
  a housing;
  an electronic display carried by the housing, the electronic display configured to visually present information;
  non-transitory, machine-readable storage media carried by the housing, the non-transitory, machine-readable storage media configured to store information, wherein a set of media items captured by the image capture device is stored in the non-transitory, machine-readable storage media; and
  one or more physical processors carried by the housing, the one or more physical processors configured by machine-readable instructions to:
    obtain a user identification of one or more media items from the set of media items captured by the image capture device for sharing;
    run a web server that hosts the one or more identified media items;
    run a media access webpage for a computing device to access the one or more identified media items hosted by the web server run by the image capture device;
    create a communication network for the computing device to connect to the image capture device, the communication network having a network name and a network password;
    generate a machine-readable optical code, the machine-readable optical code conveying the network name and the network password of the communication network;
    present the machine-readable optical code on the electronic display, wherein a computing device that captures an image including the machine-readable optical code connects to the communication network using the network name and the network password of the communication network conveyed by the machine-readable optical code, further wherein responsive to the computing device connecting to the communication network created by the image capture device, the media access webpage run by the image capture device is automatically opened by the computing device, the media access webpage operating as a captive portal for the one or more identified media items hosted by the web server run by the image capture device, the media access webpage including one or more options for a user of the computing device to select one or more media items from among the one or more identified media items hosted by the web server for access by the computing device;
    obtain, from the computing device, selection of the one or more media items among the one or more identified media items hosted by the web server; and
    provide the one or more selected media items to the computing device.

4. The image capture device of claim 3, wherein the image capture device providing the one or more selected media items to the computing device includes the image capture device transmitting a given selected media item to the computing device.

5. The image capture device of claim 3, wherein the image capture device providing the one or more selected media items to the computing device includes the image capture device streaming a preview of a given selected media item to the computing device.

6. The image capture device of claim 5, wherein the preview of the given selected media item is presented on the media access webpage opened on the computing device.

7. The image capture device of claim 3, wherein the media access webpage is automatically opened in a browser running on the computing device.

8. The image capture device of claim 3, wherein the media access webpage is automatically opened in a mobile application running on the computing device.

9. The image capture device of claim 3, wherein the machine-readable optical code includes a QR code.

10. The image capture device of claim 3, wherein the set of media items captured by the image capture device includes one or more images and/or one or more videos captured by the image capture device.

11. The image capture device of claim 3, wherein the web server and the media access webpage run by the image capture device enables offload of the set of media items captured by the image capture device to the computing device without requiring pairing between the image capture device and the computing device.

12. A method for sharing content, the method performed by an image capture device including one or more processors, an electronic display configured to visually present information, and non-transitory, machine-readable storage media configured to store information, wherein a set of media items captured by the image capture device is stored in the non-transitory, machine-readable storage media, the method comprising:
  obtaining, by the image capture device, a user identification of one or more media items from the set of media items captured by the image capture device for sharing;
  running, by the image capture device, a web server that hosts the one or more identified media items;
  running, by the image capture device, a media access webpage for a computing device to access the one or more identified media items hosted by the web server run by the image capture device;
  creating, by the image capture device, a communication network for the computing device to connect to the image capture device, the communication network having a network name and a network password;
  generating, by the image capture device, a machine-readable optical code, the machine-readable optical code conveying the network name and the network password of the communication network;
  presenting, by the image capture device, the machine-readable optical code on the electronic display, wherein a computing device that captures an image including the machine-readable optical code connects to the communication network using the network name and the network password of the communication network conveyed by the machine-readable optical code, further wherein responsive to the computing device connecting to the communication network created by the image capture device, the media access webpage run by the image capture device is automatically opened by the computing device, the media access webpage operating as a captive portal for the one or more identified media items hosted by the web server run by the image capture device, the media access webpage including one or more options for a user of the computing device to select one or more media items from among the one or more identified media items hosted by the web server for access by the computing device;

obtaining from the computing device, by the image capture device, selection of the one or more media items among the one or more identified media items hosted by the web server; and providing, by the image capture device, the one or more selected media items to the computing device.

13. The method of claim 12, wherein the image capture device providing the one or more selected media items to the computing device includes the image capture device transmitting a given selected media item to the computing device.

14. The method of claim 12, wherein the image capture device providing the one or more selected media items to the computing device includes the image capture device streaming a preview of a given selected media item to the computing device.

15. The method of claim 14, wherein the preview of the given selected media item is presented on the media access webpage opened on the computing device.

16. The method of claim 12, wherein the media access webpage is automatically opened in a browser running on the computing device.

17. The method of claim 12, wherein the media access webpage is automatically opened in a mobile application running on the computing device.

18. The method of claim 12, wherein the machine-readable optical code includes a QR code.

19. The method of claim 12, wherein the set of media items captured by the image capture device includes one or more images and/or one or more videos captured by the image capture device.

20. The method of claim 12, wherein the web server and the media access webpage run by the image capture device enables offload of the set of media items captured by the image capture device to the computing device without requiring pairing between the image capture device and the computing device.

* * * * *